US008514434B2

(12) United States Patent  
Iida

(10) Patent No.: US 8,514,434 B2  
(45) Date of Patent: Aug. 20, 2013

(54) PRINT CONTROL DEVICE, PRINT CONTROL SYSTEM, AND PRINT CONTROL METHOD

(75) Inventor: Hirotaka Iida, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 857 days.

(21) Appl. No.: 12/620,224

(22) Filed: Nov. 17, 2009

(65) Prior Publication Data

US 2010/0271658 A1  Oct. 28, 2010

(30) Foreign Application Priority Data

Apr. 24, 2009  (JP) .................................. 2009-105864

(51) Int. Cl.
*G06F 3/1293* (2006.01)
*G06F 3/12* (2006.01)
*G06F 7/14* (2006.01)
*G06F 7/32* (2006.01)

(52) U.S. Cl.
USPC ........... 358/1.15; 358/1.1; 715/277; 715/243; 715/235; 707/705; 707/708

(58) Field of Classification Search
CPC ....... G06F 3/1293; G06F 3/1296; G06F 3/12; G06F 17/32; G06F 7/14
USPC ................ 715/273–277, 233–239, 245–247; 358/1.11–1.18, 1.1, 1.2, 1.9, 2.1; 709/201–203, 709/217–219; 707/705–708
See application file for complete search history.

(56) References Cited

U.S. PATENT DOCUMENTS

| | | | |
|---|---|---|---|
| 6,549,294 B2 * | 4/2003 | Vidyanand | 358/1.12 |
| 7,383,321 B2 * | 6/2008 | Moyer et al. | 709/219 |
| 2002/0167554 A1 * | 11/2002 | Parry | 347/5 |
| 2005/0063010 A1 * | 3/2005 | Giannetti | 358/1.18 |
| 2005/0216832 A1 * | 9/2005 | Giannetti | 715/513 |
| 2008/0165383 A1 * | 7/2008 | Myoki | 358/1.15 |

FOREIGN PATENT DOCUMENTS

| | | |
|---|---|---|
| JP | 2006-293430 A | 10/2006 |
| JP | 2007-108963 A | 4/2007 |
| JP | 2008-003944 A | 1/2008 |
| JP | 2008-269453 A | 11/2008 |

* cited by examiner

*Primary Examiner* — Chad Dickerson
(74) *Attorney, Agent, or Firm* — Sughrue Mion, PLLC

(57) ABSTRACT

A print control device includes a receiving unit that receives print instruction data including item data specifying information for specifying item data to be used from the item data included in a record, and allocation information for allocating a template including plural fields and the item data to be applied to the plural fields of the template; an item data obtaining unit that sequentially specifies the record from an external database having plural records stored therein, and obtains the item data to be used from the specified record on the basis of the item data specifying information; a print data generating unit that sequentially generates print data by applying the item data obtained based on the allocation information to the plural fields of the template on the basis of the allocation information; and a print data transmitting unit that sequentially transmits the print data to an external print device.

8 Claims, 8 Drawing Sheets

FIG.4

```
          ⎧ !!VARIABLE_JOB
          ⎪ ENCODING=UTF-8
   100a  ⎨  PROJECT=customer_billing.var
          ⎪ TITLE= 'Database Variable Print Sample'
          ⎩ SEPARATER= ', '
            ...              1000a   1000b
                                        1000c
          ⎧ START_QUERY
   101a  ⎨  SELECT ID, Name, Address FROM Customers ORDER BY ID;
          ⎩ END_QUERY
   102a  { f_ID = @ID, f_NAME = @Name, f_ADDRESS = @Address
            !!END
                    1001a     1001b              1001c
```

```
DECLARE customer_cursor INSENSITIVE SCROLL CURSOR FOR SELECT ID,
Name, Address FROM Customers ORDER BY ID;
```

```
OPEN customer_cursor;
LOOP
    FETCH customer_cursor INTO record;
    ...
END LOOP;
CLOSE customer_cursor;
```

```
!!VARIABLE_JOB
ENCODING=UTF-8
PROJECT=customer_billing.var
TITLE= 'Database Variable Print Sample'
SEPARATER= ', '
...      1001a   1001b    1001c
f_ID, f_NAME, f_ADDRESS
1. FUJI TARO, ○○PREFECTURE,○○SHI ○○1-2-3
!!CONTINUE
```

111a { (brace grouping the ENCODING through SEPARATER lines)

```
!!RIP_SESSION= '1'
M, FUJI MRO,△△PREFECTURE,△△SHI△△M-M-M
N, FUJI NKO,□□PREFECTURE,□□SHI□□N-N-N
...
!!CONTINUE
```

```
!!RIP_SESSION= '1'
...
X, FUJI XRO,◎◎PREFECTURE,◎◎SHI◎◎X-X-X
!!END
```

PRINT CONTROL DEVICE, PRINT CONTROL SYSTEM, AND PRINT CONTROL METHOD

CROSS-REFERENCE TO RELATED APPLICATIONS

This application is based on and claims priority under 35 USC 119 from Japanese Patent Application No. 2009-105864 filed Apr. 24, 2009.

BACKGROUND

Technical Field

The present invention relates to a print control device, a print control system, and a print control method.

SUMMARY

According to an aspect of the present invention, there is provided a print control device including: a receiving unit that receives print instruction data including item data specifying information for specifying item data to be used from the item data included in a record, and allocation information for allocating a template including a plurality of fields and the item data to be applied to the plurality of fields of the template; an item data obtaining unit that sequentially specifies the record from an external database having the plurality of records stored therein, and obtains the item data to be used from the specified record on the basis of the item data specifying information; a print data generating unit that sequentially generates print data by applying the item data obtained based on the allocation information to the plurality of fields of the template on the basis of the allocation information; and a print data transmitting unit that sequentially transmits the print data to an external print device.

BRIEF DESCRIPTION OF THE DRAWINGS

Exemplary embodiments of the present invention will be described in detail based on the following figures, wherein:

FIG. 4 is a schematic diagram illustrating a configuration example of a variable job file according to the exemplary embodiment of the present invention;

FIG. 5 is a schematic diagram illustrating a configuration example of a cursor according to the exemplary embodiment of the present invention;

FIG. 6 is a schematic diagram illustrating a configuration example of a cursor processing file according to the exemplary embodiment of the present invention;

FIGS. 7A to 7C are schematic diagrams illustrating a configuration example of variable data according to the exemplary embodiment of the present invention;

DETAILED DESCRIPTION (Configuration of Image Forming System)

Figure 1:
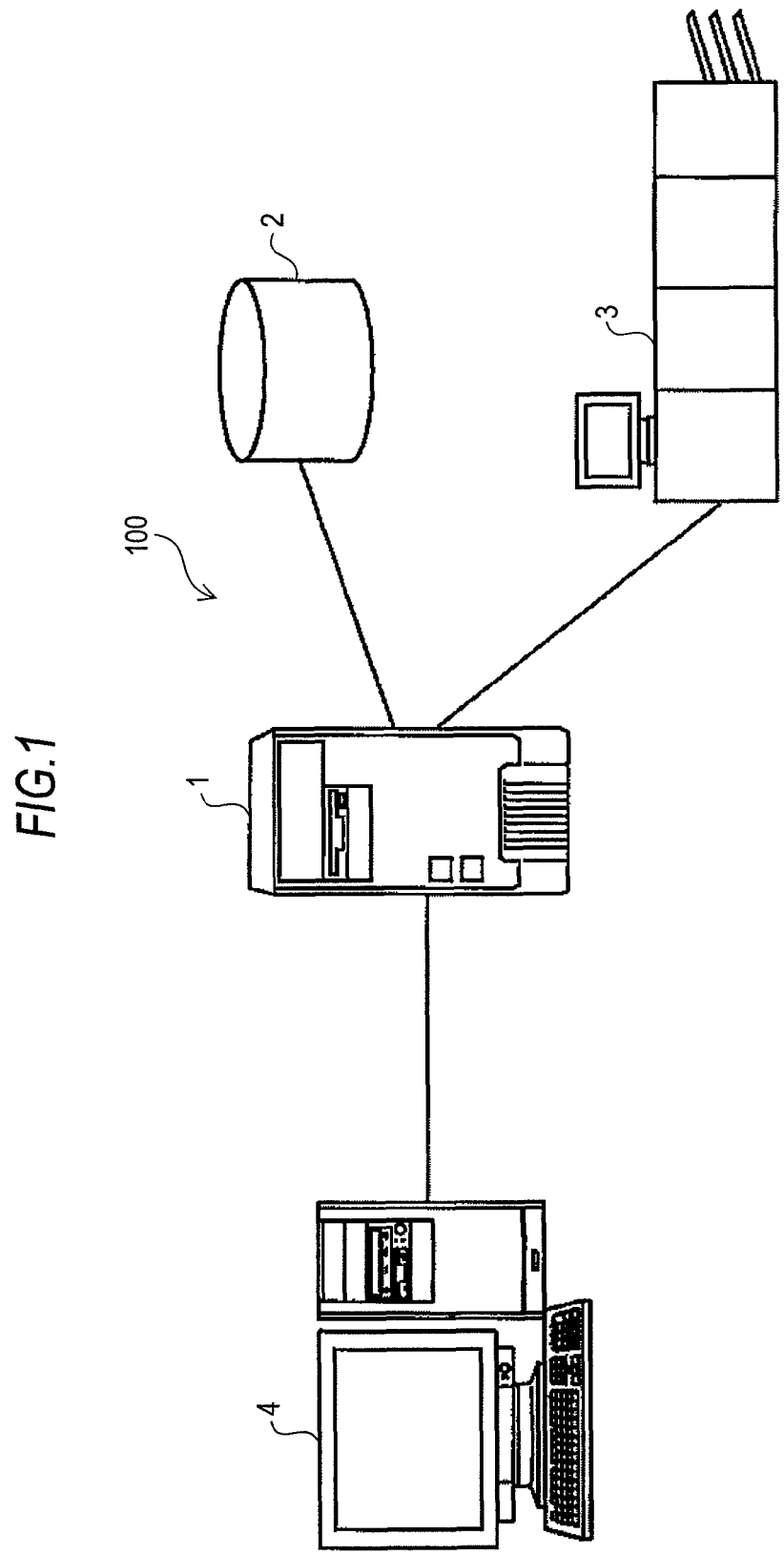
FIG. 1 is a schematic diagram illustrating a configuration example of a print control system according to an exemplary embodiment of the present invention.

FIG. 1 is a schematic diagram illustrating a configuration example of a print control system according to an exemplary embodiment of the present invention.

A print control system 100 includes a print server 1, database 2, a printer 3 and a terminal device 4. The print server 1 functions as a print control device. Specifically, the print server 1 receives print instruction data (a variable job file) for executing a print instruction from the terminal device 4 described later, generates print data (variable data) based on data obtained from the database 2 described later, and gives a print instruction to the printer 3 described later by using the print data. The database 2 stores data including a plurality of records. Each of the records includes a plurality of item data. The printer 3 functions as a print device. Specifically, the printer 3 generates a print image by applying the print data to the template on the basis of the print instruction received from the print server 1. The terminal device 4 generates the variable job file when a user specifies both of the template and the item data to be used.

Additionally, the print server 1 includes electric parts including a CPU (Central Processing Unit), an HDD (Hard Disk Drive), etc. The terminal device 4 operates on the basis of an operation signal inputted from an operating unit such as a mouse or a keyboard, includes electrical parts such as CPU or HDD, to process information, and displays an image on a display unit such as a LCD (Liquid Crystal Display) panel.

Figure 2:
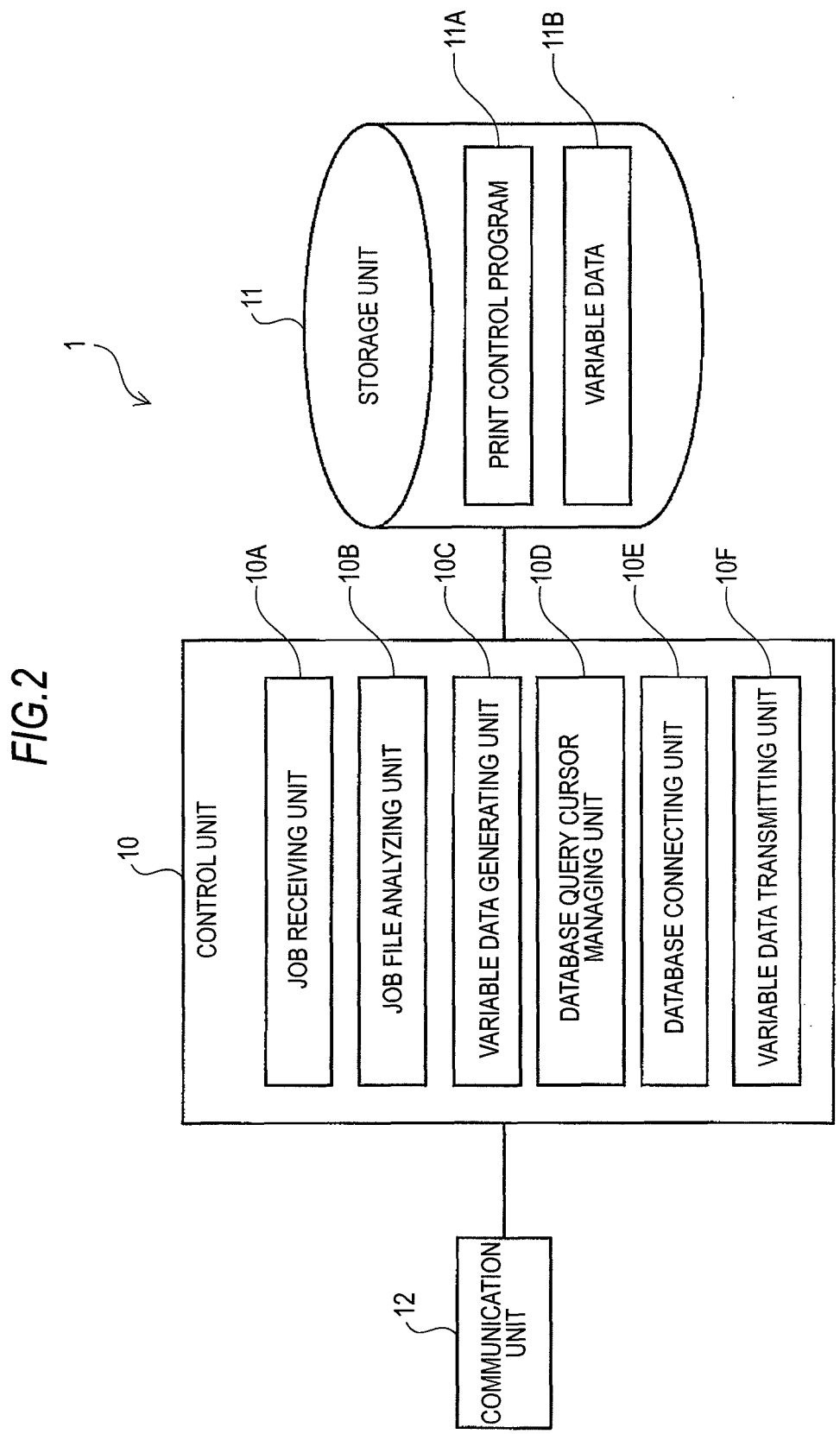
FIG. 2 is a schematic diagram illustrating a configuration example of a print server according to the exemplary embodiment of the present invention.

FIG. 2 is a schematic diagram illustrating a configuration example of the print server according to the exemplary embodiment of the present invention.

The print server 1 includes a control unit 10, a storage unit 11 and a communication unit 12. The control unit 10 is constructed by a CPU, etc., controls respective parts of the print server 1, and runs various programs. The storage unit 11 is constructed by storage devices including an HDD, a flash memory, etc. and stores information. The communication unit 12 communicates with the database 2, the printer 3 and the terminal device 4 via a network such as a LAN (Local Area Network) or the like.

The control unit 10 makes a job receiving unit 10A, a job file analyzing unit 10B, a variable data generating unit 10C, a database query cursor managing unit 10D, a database connecting unit 10E and a variable data transmitting unit 10F operate by running a print control program 11A described later.

The job receiving unit 10A receives a variable job file from the terminal device 4. The job file analyzing unit 10B analyses item data and a template, both of which are specified in the variable job file received by the job receiving unit 10A. The variable data generating unit 10C generates variable data 11B described later by obtaining information of the specified item data from the database 2 and associating the obtained information with the fields of the template. The database query cursor managing unit 10D creates a cursor in a record of the database 2 when the variable data generating unit 10C obtains the data from the database 2. The database connecting unit 10E manages the communication with the database 2. The variable data transmitting unit 10F transmits the generated variable data 11B to the printer 3.

The storage unit 11 stores the print control program 11A and the variable data 11B. The print control program 11A makes the control unit 10 operate as the various units as described above, and the variable data 11B is generated by the variable data generating unit 100.

Figure 3:
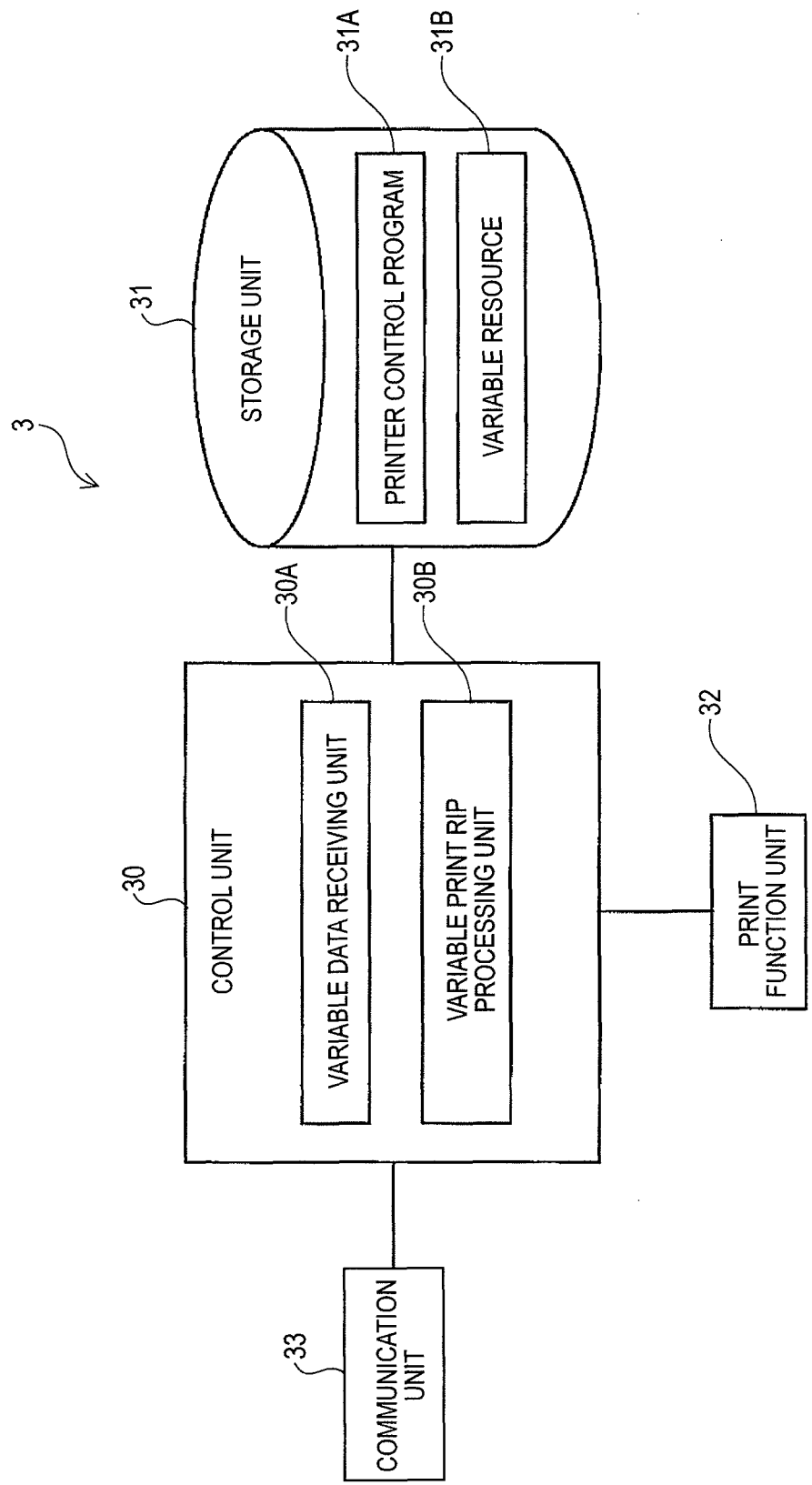
FIG. 3 is a schematic diagram illustrating a configuration example of a printer according to the exemplary embodiment of the present invention.

FIG. 3 is a schematic diagram illustrating a configuration example of the printer according to the exemplary embodiment of the present invention.

The printer 3 includes a control unit 30, a storage unit 31, a communication unit 33 and a print function unit 32. The control unit 30 is constructed by a CPU, etc. The control unit 30 controls the parts of the printer, and runs various programs. The storage unit 31 is constructed by storage devices including a HDD, a flash memory, etc. and stores information. The communication unit 33 communicates with the print server 1, the database 2 and the terminal device 4 via a network such as a LAN (Local Area Network). The print function unit 32 includes a tray for accommodating a single or plurality of sheets of paper and a mechanism for executing printing on the respective sheets.

The control unit 30 makes a variable data receiving unit 30A and a variable print RIP (Raster Image Processor) processing unit 30B operate by running a printer control program 31A described later.

The variable data receiving unit 30A receives the variable data from the print server 1. The variable print RIP processing unit 30B analyses the variable data received by the variable data receiving unit 30A, and obtains a variable resource 31B described later on the basis of the content described in the variable data to generate a print image.

The storage unit 31 stores the printer control program 31A and the variable resource 31B. The printer control program 31A makes the control unit 30 operate as the respective units as described above, and the variable resource 31B is a variable printing resource such as a template and a font.

FIG. 4 is a schematic diagram illustrating a configuration example of a variable job file according to the exemplary embodiment of the present invention.

A variable job file 100A is information that is generated in the terminal device 4 and is then received by the print server 1. The variable job file 100A includes a variable print job 100a, a database query 101a and field allocation information 102a. The variable print job 100a functions as allocation information for defining a print job. The database query 101a functions as item-data specifying information for specifying item data to extract data from the database 2. The item data are described while interposed between "START_QUERY" and "END_QUERY". The field allocation information 102a specifies allocation of the data specified by the database query 101a to the fields of the template.

The database query 101a includes item data 1000a to 1000c to be specified. On the other hand, the field allocation information 102a includes fields 1001a to 1001c to which the specified data are allocated.

FIG. 5 is a schematic diagram illustrating a configuration example of a cursor according to the exemplary embodiment of the present invention.

A cursor 100D is created in the database query cursor managing unit 10D of the print server 1. The cursor 100D is information for creating a cursor to indicate a row obtaining position for a row indicating a record of the database 2.

FIG. 6 is a schematic diagram illustrating a configuration example of a cursor processing file according to the exemplary embodiment of the present invention.

A cursor processing file 100C is generated by the variable data generating unit 100 of the print server 1. The cursor processing file 100C is information for obtaining data from a record by using the cursor created in the database 2. The obtained data is stored in the storage unit 11 as the variable data 11B.

FIG. 7 is a schematic diagram illustrating a configuration example of variable data according to the exemplary embodiment of the present invention.

Variable data 110a are variable data which are first generated by the variable data generating unit 100 of the print server 1 on the basis of the data that the variable data generating unit 100 obtains from the database 2. As illustrated in FIG. 7A, the variable data 110a includes descriptions of the variable print job 100a as a variable print job 111a in its first half part. Additionally, the variable data 110a includes, in its last half part, information for specifying allocation of the fields of the template, the data obtained from the database 2, and a description "!!CONTINUE" for indicating that there still exists subsequent variable data.

Variable data 110b is variable data to be generated subsequently to the variable data 110a. As illustrated in FIG. 7B, the variable data 110b includes RIP session information which is a sequel of the variable data and indicates an assembly for generating the same print image, a sequel of the data obtained from the database 2 and a description "!!CONTINUE" representing that there still exists subsequent variable data. As described later, information received from the variable print RIP processing unit 30B is used as the RIP session information.

Variable data 110c is variable data to be finally generated after the variable data 110a, 110b, etc. are sequentially generated. As illustrated in FIG. 7C, the variable data 110c includes RIP session information which is a sequel of the variable data and indicates an assembly for generating the same print image, and a sequel of data obtained from the database 2, and a description "!!END" indicating that the variable data 110c is the last variable data.

(Operation)

A series of operations to be executed by the print control system of the exemplary embodiment of the present invention will be described hereunder with reference to the drawings.

For example, through the manipulation of the terminal device 4, a user selects desired data from the item data in the database 2 and a layout file to be used as a template of the variable printing. Accordingly, a variable job file is generated in the terminal device 4. Subsequently, the variable job file is transmitted from the terminal device 4 to the printer server 1.

The following description relates to the content that the print server 1 makes the printer 3 operate by processing the variable job file.

Figure 8:
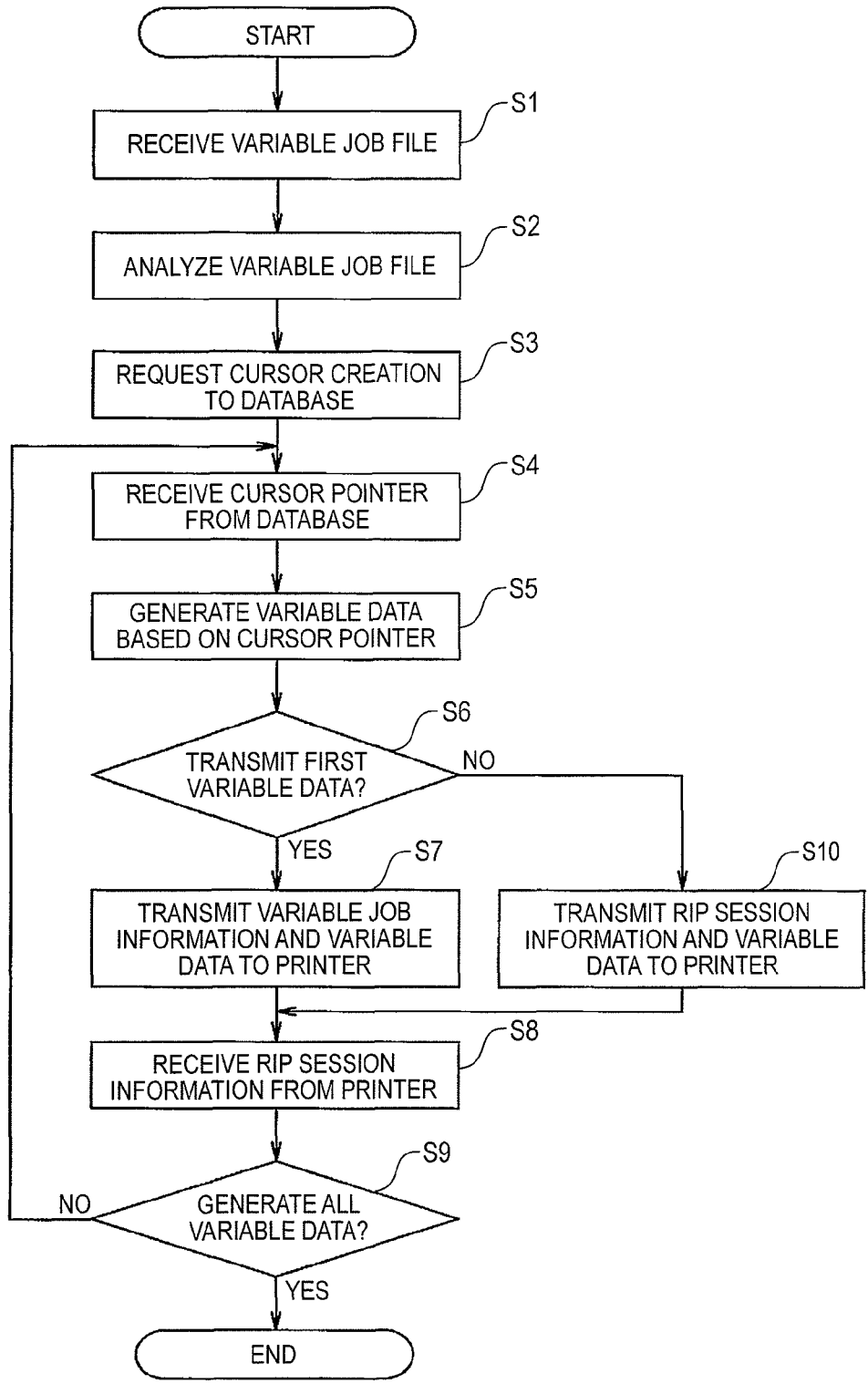
FIG. 8 is a flowchart illustrating an example of a series of operations to be executed by the print control system according to the exemplary embodiment of the present invention.

FIG. 8 is a flowchart illustrating an example operation to be executed by the print control system according to the exemplary embodiment of the present invention.

First, the job receiving unit 10A of the print server 1 receives a variable job file as a print job from the terminal device 4 via the communication unit 12 (Step S1). Subsequently, the job file analyzing unit 10B analyses the content of the variable print job 100a of the variable job file 100A received by the job receiving unit 10A, the database query 101a and the field allocation information 102a which are illustrated in FIG. 4 (Step S2). Subsequently, the database query cursor managing unit 10D creates the cursor 100D on the basis of the content analyzed by the job file analyzing unit 10B, and transmits the cursor processing file 100C to the database 2 for requesting creation of a cursor (Step S3). The print server 1 is configured to access the database 2 via the database connecting unit 10E unless any particular description is made hereunder.

The database query cursor managing unit 10D receives a pointer indicating the current position of the cursor as a reply from the database 2 to the processing of Step S3 (Step S4). The variable data generating unit 10C receives data of the item data specified in a record of the database 2 on the basis of the pointer of the cursor, and generates the variable data 110a to 110c (Step S5). The data of the specified item data may be obtained from a single or plurality of records.

When the variable data generated by the variable data generating unit 10C is the first variable data (Step S6; Yes), the variable data transmitting unit 10F transmits the variable data together with the variable print job 111a to the printer as in the case of the variable data 110a illustrated in FIG. 7A, for example (Step S7).

On the other hand, when the variable data generated by the variable data generating unit 10C is not the first variable data in Step S6 (Step S6; No), the variable data transmitting unit 10F transmits the variable data to the printer 3 as in the case of the variable data 110b or 110c illustrated in FIG. 7B or FIG. 7C (Step S7).

Subsequently, when the printer 3 completes the RIP processing of the variable data 110a, 110b or 110c, the print server 1 receives the RIP session information from the printer 3 (Step S8). The aforementioned Steps S4 to S8 are executed until the variable data generating unit 100 completes generation of all the variable data by processing the variable job files received by the variable data generating unit 100 (Step S9).

Figure 9:
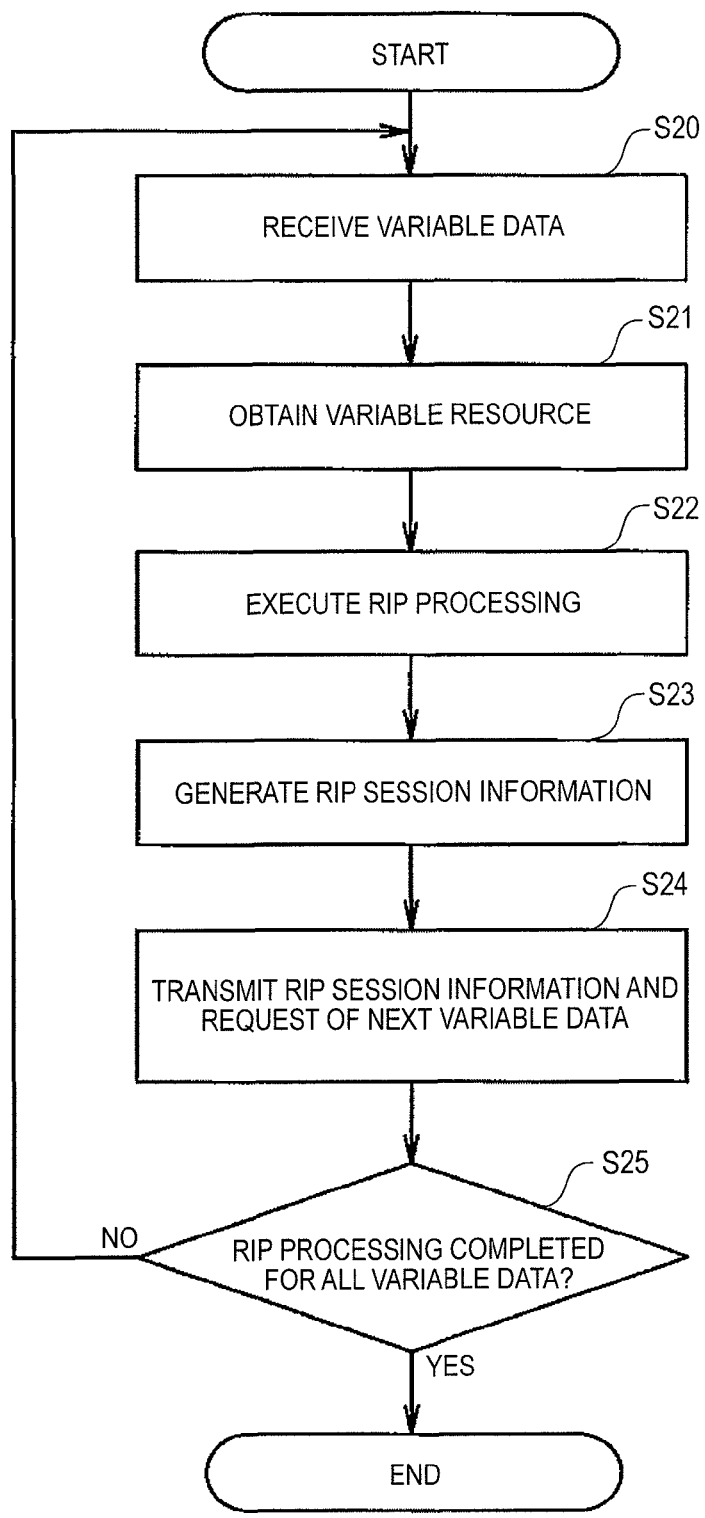
FIG. 9 is a flowchart for illustrating another example of a series of operation to be executed by the print control system according to the exemplary embodiment of the present invention.

FIG. 9 is a flowchart illustrating another example of the operation to be executed by the print control system according to the exemplary embodiment of the present invention. The following operation is executed simultaneously with the operation described with reference to FIG. 8.

First, the variable data receiving unit 30A of the printer 3 receives variable data from the print server 1 via the communication unit 33 (Step S20). Subsequently, the variable print RIP processing unit 30B obtains a layout file including a template, a necessary font, image data, etc. from the variable resource 31B on the basis of a variable print job of the received variable data (Step S21).

Subsequently, the variable print RIP processing unit 30B executes the RIP processing by using the received variable data and the obtained variable resource 31B (Step S22). When the variable print RIP processing unit 30B finishes the RIP processing, it generates RIP session information so that the print image information generated in the RIP processing constitutes a series of information (Step S23). Subsequently, the variable print RIP processing unit 30B transmits the generated RIP session information together with a request of subsequent variable data to the printer server 1 (Step S24).

The aforementioned Steps S20 to S24 are executed until the RIP processing is executed on the last variable data 110c including the description "!!END" (Step S25). The print image information generated in the RIP processing is temporarily stored in a memory or the like (as not illustrated), and then printed on a sheet of paper as an image by the print function unit 32.

[Other Exemplary Embodiments]

The present invention is not limited to the aforementioned exemplary embodiment. Various changes and/or modifications are possible for the aforementioned exemplary embodiment without departing from the subject matter of the present invention. For example, a network stream may be created between the variable data transmitting unit 10F of the print server 1 and the variable data receiving unit 30A of the printer 3. In this case, the variable data generating unit 10C transmits the generated variable data by using the network stream as needed, and the variable print RIP processing unit 30B directly obtains the variable data by using the network stream. Accordingly, the variable print RIP processing unit 30B is not required to request the variable data generating unit 10C to transmit the variable data. Consequently, it is not necessary to use the RIP session information.

Alternatively, the variable data receiving unit 30A may generate a variable data queue. In this case, the variable data generating unit 100 transmits the generated variable data to the variable data receiving unit 30A through the variable data transmitting unit 10F as needed. The variable data receiving unit 30A queues the received variable data into the created variable data queue. Then, the variable print RIP processing unit 30B sequentially obtains the variable data from the queue and executes the RIP processing. Accordingly, the variable print RIP processing unit 30B is not required to request the variable data generating unit 100 to transmit the variable data. Consequently, it is not necessary to use the RIP session information.

Alternatively, the variable print RIP processing unit 30B is not limited to a single RIP-processing executing unit. For example, the variable print RIP processing unit 30B may be configured to execute a plurality of RIP processing in parallel. In this case, the variable data generating unit 100 inquires the printer 3 about the number of RIP processing that can be executed in parallel, and transmits the variable data including the same number of records as the number of RIP processing at the transmission time of the first variable data.

Furthermore, the various units to be used in the aforementioned exemplary embodiment such as the job receiving unit 10A, the job file analyzing unit 10B, the variable data generating unit 10C, the database query cursor managing unit 10D, the database connecting unit 10E, the variable data transmitting unit 10F, the variable data receiving unit 30A and the variable print RIP processing unit 30B may be read from a storage medium such as CD-ROM into a storage unit in the device, or may be downloaded from a server device or the like connected to a network such as the Internet into a storage unit of the device. Alternatively, a part or all of the units to be used in the aforementioned exemplary embodiment may be implemented by hardware such as ASIC.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the skilled in the art to understand the invention for various embodiments and with the various modifications as are suited to the particular use contemplated. It is intended that the scope of the invention be defined by the following claims and their equivalents.

What is claimed is:

1. A print control device comprising:
   a receiving unit that receives a variable job file including a database query for specifying item data included in a plurality of records to be used as an object of variable printing from an external database, and field allocation information for allocating item data to a plurality of fields of a template;
   an item data obtaining unit that sequentially specifies the plurality of records from the external database, and obtains the item data to be used from the specified plurality of records on a basis of the database query;
   a print data generating unit that sequentially generates first and second print data by applying the item data obtained based on the database query to the plurality of fields of the template on a basis of the field allocation information; and a print data transmitting unit that sequentially transmits the first and second print data to an external print device;

wherein the second print data includes RIP session information which is generated by the external print device, and which indicates that the second print data is sequential to the first print data, and indicates a same print image which is a continuation of data acquired from the external database;

the second print data is generated after the external print device performs RIP processing according to the first print data, generates the RIP session information, and sends RIP session information to the print control device; and wherein when the print data generating unit generates the first print data, the print data transmitting unit transmits the first print data to the external print device, and when the print data generating unit generates the second print data, the print data transmitting unit transmits the second print data and the RIP session information to the external print device.

2. The print control device according to claim 1, wherein the first print data includes the field allocation information, and the second print data does not include the field allocation information.

3. A print control system comprising:
an external print device; and
a print control device,
wherein the print control device is configured to:
receive a variable job file including a database query for specifying item data included in a plurality of records to be used as an object of variable printing from an external database, and field allocation information for allocating item data to a plurality of fields of a template;
sequentially specify the plurality of records from the external database;
obtain the item data to be used from the specified plurality of records on a basis of the database query;
sequentially generate first and second print data by applying the item data obtained based on the database query to the plurality of fields of the template on a basis of the field allocation information; and
sequentially transmit the first and second print data to an external print device,
wherein the second print data includes RIP session information which is generated by the external print device, and which indicates that the second print data is sequential to the first print data, and indicates a same print image which is a continuation of data acquired from the external database;
the second print data is generated after the external print device performs RIP processing according to the first print data, generates the RIP session information, and sends the RIP session information to the print control device; and
wherein when the print control device generates the first print data, the first print data is transmitted to the external print device, and when the print control device generates the second print data, the second print data and the RIP session information are transmitted to the external print device.

4. A print control method comprising:
receiving a variable job file including a database query for specifying item data included in a plurality of records to be used as an object of variable printing from an external database, and field allocation information for allocating item data to a plurality of fields of a template;
sequentially specifying the plurality of records from the external database;
obtaining the item data to be used from the specified plurality of records on a basis of the database query;
sequentially generating first and second print data by applying the item data obtained based on the database query to the plurality of fields of the template on a basis of the field allocation information; and
sequentially transmitting the first and second print data to an external print device,
wherein the second print data includes RIP session information which is generated by the external print device, and which indicates that the second print data is sequential to the first print data, and indicates a same print image which is a continuation of data acquired from the external database;
the second print data is generated after the external print device performs RIP processing according to the first print data, generates the RIP session information, and sends the RIP session information to the print control device; and
wherein when generating the first print data, transmitting the first print data to the external print device, and when generating the second print data, transmitting the second print data and the RIP session information to the external print device.

5. The print control method according to claim 4, wherein the first print data includes the field allocation information, and the second print data does not include the field allocation information.

6. The print control device according to claim 1, wherein the item data obtaining unit requests creation of a cursor in the external database based on the variable job file, receives a pointer indicating a current position of the cursor within the external database, and receives data of the item data specified in the record of the external database based on the pointer of the cursor.

7. The print control system according to claim 3, wherein obtaining the item data further comprises requesting creation of a cursor in the external database based on the variable job file, receiving a pointer indicating a current position of the cursor within the external database, and receiving data of the item data specified in the record of the external database based on the pointer of the cursor.

8. The print control method according to claim 4, wherein obtaining the item data further comprises requesting creation of a cursor in the external database based on the variable job file, receiving a pointer indicating a current position of the cursor within the external database, and receiving data of the item data specified in the record of the external database based on the pointer of the cursor.

* * * * *